Patented June 2, 1942

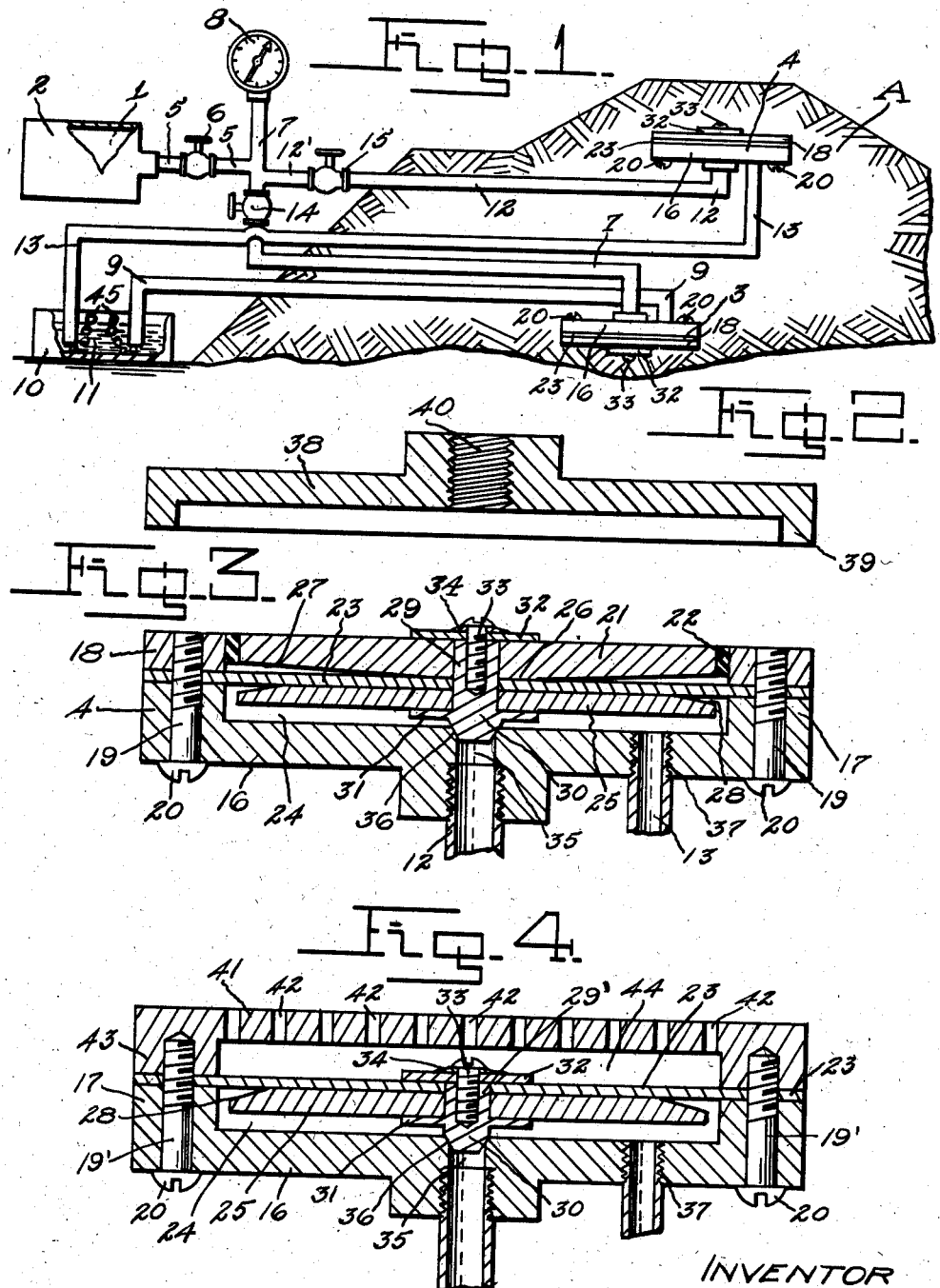

2,284,707

UNITED STATES PATENT OFFICE 2,284,707

APPARATUS FOR MEASURING SOIL OR HYDROSTATIC PRESSURES

Francis J. Wilson, Memphis, Tenn.

Application January 18, 1940, Serial No. 314,478

9 Claims. (Cl. 265—47)

(Granted under the act of March 3, 1883, as amended April 30, 1928; 370 O. G. 757)

This invention described herein may be manufactured and used by or for the Government for governmental purposes, without the payment to me of any royalty thereon.

This invention relates to an apparatus for measuring the soil or hydrostatic pressures under dams, levees and foundation structures.

Another object of the invention is to provide an apparatus for determining the soil or hydrostatic pressures under dams, levees and foundation structures, which apparatus is simple in design, having but few parts, which may be quickly applied to a dam, levee or foundation structure and made of such material that it will not be liable to deteriorate through moisture or age.

Another object of the invention is to provide improved soil and hydrostatic pressure cells for measuring the soil and hydrostatic pressures under dams, levees and foundation structures, which cells are simple and rugged in construction, light in weight, made of such material that they are not liable to deteriorate through moisture or age and which will remain in operative condition substantially for the lifetime of the dam, levee or foundation structure to which they may be applied.

Heretofore the soil and hydrostatic pressures under dams, levees and foundation structures were determined by using complicated electrical equipment including an electric circuit, switches and contacts, made of material which was liable to deteriorate because of moisture or age, thus allowing the equipment to be used only for a limited period before various parts thereof had to be repaired or replaced.

It is therefore the aim and purpose of this invention to provide an apparatus including soil or hydrostatic pressure cells for determining the soil or hydrostatic pressures under dams, levees and foundation structures, which method is carried out in a simple manner and which apparatus is simple in construction and made of such material that the apparatus will not be liable to deteriorate because of moisture or age and therefore will last for substantially the lifetime of the dam, levee or foundation structure on which it is employed.

Briefly stated, the invention consists of installing soil or hydrostatic pressure cells at any point in a dam, levee or foundation structure where it is desired to measure the soil or hydrostatic pressures thereof, the said cells being adapted to be turned in any direction so that side pressure or horizontal forces of the soil or fluid in said dams, levees or foundation structures, may be measured equally as effective as the vertical forces. A fluid under pressure such as air from a source of supply is adapted to be connected alternately in communication with the soil or hydrostatic pressure cells and the cells in turn are connected in communication with a receptacle containing a fluid. When the pressure of the air from the source of supply on the cells is slightly greater than the internal pressure caused by the soil or fluid in the dam, levee or foundation structure against the cell, air bubbles are produced in the fluid of the receptacle, thus indicating that the pressure from the source of compressed air supply is substantially equal to the soil or hydrostatic pressures of the dam, levee or foundation structure. A gauge for indicating the amount of pressure required to produce the air bubbles is connected to be operated by the air pressure from the source of air supply.

With the above and other objects and advantages in view the invention consists in certain novel features of construction and operation of parts which will hereinafter appear and in which—

Fig. 1 is a fragmentary assembly view of the component parts of the invention and illustrating soil pressure cells placed at different points in a levee;

Fig. 2 is an enlarged vertical sectional view of a cap which may be used in carrying out the invention;

Fig. 3 is an enlarged fragmentary vertical sectional view, partly in elevation of a soil pressure cell used in carrying out the invention; and Fig. 4 is an enlarged fragmentary vertical sectional view, partly in elevation of a hydrostatic pressure cell which is also used in carrying out the invention.

In the illustrated embodiment characterizing the invention, I indicates a source of fluid such as air under pressure provided within a container 2, which is connected in communication with a plurality of pressure cells 3 and 4, illustrated as being of the soil pressure type and adapted to be placed in a horizontal position at different points in a levee indicated generally by A for measuring the vertical forces of the soil in the levee. The cells 3 and 4 may be turned in a vertical direction so that side pressure or horizontal forces of the soil in the levee may be measured equally as effective as the vertical forces.

The container 2 for the source of air supply under pressure is connected in communication with the soil pressure cells 3 and 4 by means of a main conduit section 5 containing a main valve 6 and connected at one end to the container 2 and at its other end to a branch conduit 7 having any suitable type of pressure gauge 8 provided on the free end thereof for indicating the air pressure supplied from the container 2 to the soil pressure cells. The branch conduit 7 leads from the pressure gauge 8 to the pressure cell 3, which is connected by means of a conduit 9 in communication with a receptacle 10 in the form of a basin or trough adapted to contain a fluid 11, such as water.

The soil pressure cell 4 is connected in communication with the container 2 for the compressed air 1 by means of a branch conduit 12, a conduit portion 12', the conduit 7, the conduit section 5 including the main valve 6 and is also connected in communication with the receptacle 10 containing the fluid 11 by means of a conduit 13. The free ends of the conduits 9 and 13 connected to the soil pressure cells 3 and 4 respectively extend into the fluid 11 in the receptacle 10 for a purpose which will hereinafter be described. In order to connect alternately the soil pressure cells 3 and 4 with the source of fluid supply 1 in the container 2, the branch conduits 7 and 12 are provided with a valve 14 and 15 respectively.

The improved soil pressure cell 4, illustrated in detail in Fig. 3, comprises an annular body member 16 provided with an upwardly extending annulus 17, on the upper face of which is an annular cover ring 18 which is detachably connected to the annulus 17 of the body member 16 by any suitable means such as by screws 19 having rounded slotted heads 20. Mounted within the cover ring 18 and concentric therewith is an external soil pressure plate 21, which is of a smaller external diameter than the internal diameter of the cover ring 18 and is movably supported in the cover ring by means of a ring 22 made of any suitable elastic material such as rubber. The elastic ring 22 is interposed between the cover ring 18 and the external pressure plate 21 to permit an inward or outward movement of the external pressure plate 21 on the cover ring and to form an airtight connection therebetween. Interposed between the annulus 17 of the body member 16 and the cover ring 18 is a diaphragm 23 made preferably of metal and securely clamped at its outer edge between the annulus 17 of the body member 16 and the cover ring 18 forming an airtight compartment 24 within the body member. Mounted within the compartment 24 is an internal pressure plate 25 which is adapted to abut against the lower side of the diaphragm 23, the upper side of the diaphragm 23 being engaged by the inner central surface portion 26 of the external pressure plate 21. The inner surface 27 of the external pressure plate 21 is beveled upwardly and outwardly from the inner central surface portion 26 thereof and the upper surface at the outer end of the internal pressure plate 25 is beveled downwardly and outwardly at 28, for permitting the external and internal pressure plates 21 and 25 respectively to engage more efficiently the diaphragm 23 upon movement of the diaphragm. Concentrically mounted on the external pressure plate 21, diaphragm 23 and the internal pressure plate 25 is a valve 29 having a downwardly extending frusto-conical shaped head 30 provided with an integral horizontally extending flange 31 which is adapted to abut against the lower surface of the internal pressure plate 25 and serves to hold securely the internal pressure plate against the lower surface of the diaphragm 23. The valve 29 extends up through the internal pressure plate 25, diaphragm 23 and the external pressure plate 21 centrally thereof, and is held in place thereon by means of a washer 32 and a screw 33 which extends through the washer and threadably engages the upper end of the valve 29. The screw 33 may be affixed to the washer 32 by means of solder, as indicated at 34, if desired.

The body member 16 is provided with a central opening 35 which extends into the compartment 24 and terminates at its inner end in an upwardly and outwardly flared opening providing a valve seat 36 for the head 30 of the valve 29 and the lower portion of the opening 35 is threaded for engagement with a threaded end of the branch conduit 12, leading to the source of fluid supply 1 through the branch conduit 7 and the main conduit section 5 including the main valve 6. The body member 16 is also provided with a threaded opening 37 for attaching one end of the branch conduit 13 thereto, the other end of the conduit 13 extending into the fluid 11 in the receptacle 10, as illustrated in Fig. 1. It is readily understood that the soil pressure cell 3 is constructed in the same manner as the soil pressure cell 4 and that one end of the conduits 7 and 9 connect therewith instead of the conduits 12 and 13.

In order that the pressure gauge 8 may be calibrated prior to use, a cap 38 having an annulus 39 is provided, as illustrated in Fig. 2, which cap is adapted to be fitted over the upper portion including the external pressure plate 21 of the soil pressure cell 4, and detachably held in place thereon by any suitable means such as by C-shaped clamps (not shown). A threaded opening 40 is provided in the cap 38 for applying known air pressures through the cap onto the upper surface of the external pressure plate 21. The fluid 1 under pressure is applied from the container 2 through the main conduit section 5 containing the main valve 6, conduit section 12', valve 15, conduit section 12, through the opening 35 in the body member 16 where it impinges against the valve 29 which forces the diaphragm 23 of the soil pressure cell 4 upwardly against the action of the known air pressure applied against the upper surface of the external pressure plate 21 which forces the diaphragm downwardly. The amount of pressure required to force the diaphragm 23 upwardly against the action of the known pressure forcing it downwardly will be recorded on the pressure gauge 8, whereby the pressure gauge 8 may be calibrated.

To measure hydrostatic pressures, the cell is made in the form illustrated in Fig. 4 wherein the valve 29' is only mounted on the diaphragm 23 and the internal pressure plate 25. An annular cap 41 provided with a plurality of spaced holes or openings 42 and having a downwardly extending annulus 43 which is held in place on the body member 16 by the screws 19' is substituted on the hydrostatic pressure cell in place of the external pressure plate 21 and the cover and elastic rings 18 and 22 respectively as provided on the soil pressure cells, whereby a perforated compartment 44 is provided on the upper portion of the hydrostatic pressure cell for a purpose which will hereinafter appear.

In the operation of the apparatus for measuring the soil pressures under dams, levees and foundation structures, assuming that the cell 4 is buried in the levee A and that the valve 14 on the branch conduit 7 leading to the pressure cell 3 is closed and the valve 15 on the branch conduit 12 leading to the pressure cell 4 is opened, the main valve 6 is then slowly opened to permit a certain amount of air in the container 2 to flow under pressure, varying from a slight pressure to a pressure greater than the pressure of the soil in the levee A which is adapted to bear against the external pressure plate 21 on the cell. The air under pressure from the source of supply 1 is conducted by the main conduit section 5 from the container 1 through the main valve 6 to the branch conduit 7 where it enters the portion 12' of the branch conduit 12 leading to the opening 35 in the body portion 16 of the soil pressure cell 4 where it is caused to impinge against the head 30 of the valve 29 which forces the internal pressure plate 25, diaphragm 23 and the external pressure plate 21 upwardly against the action of the soil pressure in the levee A. Should the pressure of the air 1 from the container 2 against the valve head 30 be greater than the external pressure of the soil in the levee A against the external pressure plate 21 of the cell 4, the valve 29 will be caused to move upwardly carrying the internal pressure plate 25, diaphragm 23 and the external pressure plate 21 with it against the pressure of the soil in the levee A, whereby the valve seat 36 on the upper end of the opening 35 in the body member 16 is uncovered which permits the compressed air 1 from the container 2 to enter through the opening 35 into the compartment 24, formed in the lower portion of the cell 4. The compressed air which enters the compartment 24 will leave through the opening 37 provided in the body member 16 of the cell and enter the branch conduit 13 leading to the receptacle 10 containing the fluid 11, whereby air bubbles 45 are formed in the fluid 11 which will be immediately detected. A movement of 1/1000 of an inch of the valve 29 in the cells has been found sufficient to permit air to enter the compartment 24 and produce bubbles in the fluid 11 contained within the receptacle 10. When the air bubbles 45 have been detected in the receptacle 10 the internal pressure indicated on the gauge 8 is immediately recorded and is substantially equal to the external pressure of the soil in the levee A against the external pressure plate 21 of the cell.

To measure the soil pressure on the cell 3, which has been placed at a different point in the levee A from the cell 4, the valve 14 on the branch conduit 7 is opened and the valve 15 on the branch conduit 12 is closed, whereby the compressed air 1 from the container 2 is conducted to the cell 3 by means of the conduit 7 and the same operation takes place as previously described for the cell 4. The compressed air which has been conducted to the pressure cell 3 is in turn conducted from the cell to the fluid 11 in the receptacle 10 by the branch conduit 9 to produce the air bubbles 45 in the fluid in the receptacle, where the pressure from the source of air supply 1 applied to the cell 3 is slightly greater than the external pressure of the soil in the levee A.

To measure hydrostatic pressures, hydrostatic pressure cells of the type illustrated in Fig. 4 are substituted for the soil pressure cells 3 and 4 in the system illustrated in Fig. 1 and placed in a dam or the like (not shown), the water in the dam entering the openings 42 in the cap 41 of the hydrostatic pressure cells will be impressed against the upper surface of the diaphragm 23. When the pressure from the source of compressed air 1 becomes slightly greater than the external pressure of the water which has entered the openings 42 in the cap 41 and is caused to impinge against the upper surface of the diaphragm 43, the valve 29' is caused to be moved upward carrying the internal pressure plate 25 and the diaphragm 23 with it. Air under pressure is then caused to enter the compartment 24 and to leave through the opening 37 in the hydrostatic pressure cell where it is conducted to the receptacle 10 containing the fluid 11, whereby the air bubbles 45 are produced in the fluid 11 of the receptacle 10, and the gauge 8 will record the amount of pressure required to produce said bubbles. Hydrostatic pressure data may thereby be obtained to determine the factor of safety of dams, levees and foundation structures, to which the hydrostatic pressure cells are applied.

It will thus be seen that there is provided a highly novel method and apparatus for measuring the soil or hydrostatic pressures under dams, levees or foundation structures which is well adapted for all the purposes intended. Even through there has been herein described certain features of construction and operation of parts, it is nevertheless to be understood that various changes may be made therein without departing from the spirit or scope of the invention.

Having described my invention, what I claim as new and wish to secure by Letters Patent is:

1. In an apparatus for determining the soil pressure of a dam, levee or foundation structure comprising in combination a soil pressure cell adapted to be placed under a dam, levee or foundation structure, said soil pressure cell including a body member, a cover ring mounted on said body member, a pressure plate movably mounted in said cover ring and adapted to be acted upon by the soil pressure of said dam, levee or foundation structure, a diaphragm provided in said cell, a valve opening in said body member, a valve secured to said diaphragm and pressure plate and controlling said valve opening, a receptacle for liquid, a source of compressed air connected in communication with the valve opening in said body member and in communication with said receptacle through said valve opening, said valve adapted to be acted upon by said compressed air to force said pressure plate against the pressure of the soil of said dam, levee or foundation structure, and also to operate said valve to control said valve opening to admit air through said soil pressure cell from said source and to enter the liquid in said receptacle upon the pressure of the compressed air being slightly greater than the pressure of the soil of said dam, levee or foundation structure, whereby air bubbles are produced in the liquid of said receptacle and means connected to indicate the amount of pressure required to operate said valve to admit air through said pressure operated means to the liquid in said receptacle to produce said air bubbles therein.

2. In an apparatus for determining the soil pressure of a dam, levee or foundation structure comprising in combination a soil pressure cell adapted to be placed under a dam, levee or foundation structure, said soil pressure cell including a body member having an annular portion and a valve opening provided therein, a cover ring secured to the annular portion of said body member, an external pressure plate adapted to be acted upon by the pressure of the soil of said ram, levee or foundation structure, elastic means movably supporting said external pressure plate in said cover ring, a diaphragm mounted on said cell between the annular portion of said body member and said cover ring, an internal pressure plate, a valve secured to said internal and external pressure plates and said diaphragm, and adapted to control said valve opening, a receptacle for a liquid, a source of compressed air connected in communication with said valve opening of said cell and in communication with said receptacle through said valve opening, said valve adapted to be acted upon by said compressed air to actuate said external pressure plate against the pressure of the soil of said dam, levee or foundation structure and also to operate said valve to control said valve opening and permit air from said source to pass through said valve opening and be injected into the liquid in said receptacle upon the pressure of the compressed air being slightly greater than the pressure of the soil of said dam, levee or foundation structure, whereby air bubbles are produced in the liquid of said receptacle and a pressure gauge connected to indicate the amount of air pressure required to operate said valve to permit said air under pressure to pass through said cell and to enter said liquid in said receptacle to produce said air bubbles therein.

3. In an apparatus for determining the hydrostatic pressure of a dam, levee or foundation structure comprising a hydrostatic pressure cell including a perforated cap adapted to be placed under a dam, levee or foundation structure at a certain point therein and to be acted upon by the pressure of the water thereof through said perforated cap, a receptacle containing a liquid, a container for air under pressure, conduit means connecting said container in communication with said hydrostatic pressure cell and in communication with the liquid in said receptacle through said cell, means on said cell adapted to control the air from said container to the liquid in said receptacle and adapted to be acted upon by the air under pressure against the pressure of the water in said dam, levee or foundation structure, and also to be operated by said compressed air to admit the air through said hydrostatic pressure cell into the liquid in said receptacle when the air pressure is slightly greater than the pressure of the water of said dam, levee or foundation structure, whereby air bubbles are produced in the liquid in said receptacle and means connected to indicate the amount of air pressure required to operate said means on said cell to admit air through said cell to the liquid in said receptacle to produce said air bubbles therein.

4. In an apparatus for determining the hydrostatic pressure of a dam, levee or foundation structure comprising in combination a hydrostatic pressure cell adapted to be placed under a dam, levee or foundation structure at a certain point therein, said hydrostatic pressure cell including a body member having a valve opening provided therein, a diaphragm mounted on said body member, an internal pressure plate, a valve mounted on said diaphragm and pressure plate and adapted to control said valve opening in said body member, a cap mounted on said diaphragm, a plurality of openings provided in said cap whereby water from said dam, levee or foundation structure is adapted to pass through said cap and be impressed on said diaphragm, a receptacle containing a liquid, a container for air under pressure, conduit means connecting said container in communication with said hydrostatic pressure cell and in communication with the liquid in said receptacle through said cell, said valve of said cell adapted to be acted upon by the air under pressure against the pressure of the water in said dam, levee or foundation structure, and to be operated by said compressed air to admit to pass through said valve opening and enter the liquid in said receptacle when the air pressure is slightly greater than the pressure of the water in said dam, levee or foundation structure, whereby air bubbles are produced in the fluid in said receptacle, means connected to indicate the amount of air pressure required to operate said valve to admit air through said cell and to enter the liquid in said receptacle to produce said air bubbles therein, and valve means on said conduit means for connecting the container for the compressed air in communication with said cell.

5. A soil pressure cell comprising a body member, a cover ring mounted on said body member, an external pressure plate movably mounted in said cover ring, a diaphragm, an internal pressure plate, a valve opening in said body member, a valve mounted on said diaphragm, internal and external pressure plates and adapted to control said valve opening and an additional opening in said body member for attaching a conduit or the like thereto.

6. A soil pressure cell comprising a body member including an annular portion, a diaphragm mounted on the annular portion of said body member, a cover ring mounted on said diaphragm, internal and external pressure plates, an elastic ring movably supporting said external pressure plate in said cover ring, a valve opening in said body member, a valve including a head mounted on said diaphragm, internal and external pressure plates and adapted to control said valve opening by its head and an additional opening in said body member for attaching a conduit or the like thereto.

7. A hydrostatic pressure cell comprising a body member including a valve opening, a perforated cap mounted on said body member, a diaphragm, an internal pressure plate, a valve mounted on said diaphragm and internal pressure plate and adapted to control said valve opening and an additional opening in said body member for attaching a conduit or the like thereto.

8. A hydrostatic pressure cell comprising a body member including an annular portion and a valve opening, a diaphragm mounted on the annular portion of said body member, a perforated cap including an annular portion mounted on said diaphragm and secured to said body member and diaphragm, an internal pressure plate, a valve including a head securing said internal pressure plate to said diaphragm and adapted to control said valve opening and an additional opening in said body member for attaching a conduit or the like thereto.

9. In an apparatus for determining the soil pressure of a dam, levee or foundation structure comprising in combination a soil pressure cell adapted to be placed under a dam, levee or foundation structure, and including a body portion, an external pressure plate movably supported on said body portion and adapted to be acted upon by the pressure of the soil of said dam, levee or foundation structure, means movably supporting said soil pressure plate on said body member and forming an airtight connection therebetween, a valve opening in said body member, a valve connected to be operated by said pressure plate and adapted to control said valve opening, a body of liquid, a source of compressed air connected in communication with said cell through the valve opening and in communication with the body of liquid from said cell, said valve adapted to be acted upon by said compressed air from said source to force said pressure plate against the pressure of the soil of said dam, levee, or foundation structure and also to operate said valve to control said valve opening to admit air through said valve opening to the cell and from the cell to the body of liquid upon the pressure of the compressed air being slightly greater than the pressure of the soil of the dam, levee or foundation structure on the pressure plate, whereby air bubbles are produced in the body of liquid and means connected to indicate the amount of air pressure required to operate said valve against the action of said pressure plate to admit air through the valve opening into the cell and from the cell to the source of liquid to produce the air bubbles therein.

FRANCIS J. WILSON.